United States Patent [19]

Carlson et al.

[11] 4,359,983

[45] Nov. 23, 1982

[54] ENGINE IDLE AIR CONTROL VALVE WITH POSITION COUNTER RESET APPARATUS

[75] Inventors: Clifford R. Carlson, Fenton; Leo H. Voelkle, Keego Harbor, both of Mich.

[73] Assignee: General Motors Corporation, Detroit, Mich.

[21] Appl. No.: 250,316

[22] Filed: Apr. 2, 1981

[51] Int. Cl.³ .......................... F02D 1/04; B60K 31/00

[52] U.S. Cl. .................................... 123/339; 123/418; 123/585

[58] Field of Search ......................... 123/339, 418, 585

[56] References Cited

U.S. PATENT DOCUMENTS

| | | | |
|---|---|---|---|
| 3,370,289 | 2/1968 | Hedgcock et al. | 123/339 |
| 3,700,996 | 10/1972 | Gutting | 123/339 |
| 4,112,885 | 9/1978 | Iwata et al. | 123/339 |
| 4,203,395 | 5/1980 | Cromas et al. | 123/339 |
| 4,237,833 | 12/1980 | Des Lauriers | 123/339 |
| 4,305,360 | 12/1981 | Meyer et al. | 123/339 |

*Primary Examiner*—Raymond A. Nelli

*Attorney, Agent, or Firm*—Robert M. Sigler

[57] ABSTRACT

A vehicle is driven by an internal combustion engine having an air induction passage with an idle air control valve positionable by a stepping motor in response to valve opening and valve closing pulses. A counter normally counts the pulses arithmetically to provide an indication of valve position. In order to bring the counter and valve position into accord, counter reset apparatus is effective, when actuated, to generate a predetermined number of valve closing pulses sufficient to stall the stepping motor against the stop, reset the counter to a predetermined reference count and generate a predetermined number of valve opening pulses to return the idle air control valve to a desired operating position with the counter counting such pulses in the normal manner. The apparatus is actuated upon the first occurrence of a vehicle speed greater than a predetermined speed such as 30 mph following a counter reset signal, which signal is generated upon each engine start and may further be generated at any time a counter error is detected. The minimum required vehicle speed guarantees that the engine will not stall during the period of the reset operation.

2 Claims, 10 Drawing Figures

ENGINE IDLE AIR CONTROL VALVE WITH POSITION COUNTER RESET APPARATUS

BACKGROUND OF THE INVENTION

This invention relates to internal combustion engines including control valves for idle air flow which are positioned by a stepper motor and further including means to arithmetically count the pulses to the stepping motor and thereby indicate the position of the valve. This type of valve position indicating apparatus might be termed a pseudo-position indicating apparatus, since it does not actually measure valve position but only indicates what the valve position should be as a result of the pulses received by the stepper motor. It may be possible for error to be introduced into such a position indicating apparatus if one or more of the pulses to the stepper motor are not counted or if a pulse counted by the counting means does not cause the valve to move. Therefore, it is desirable, from time to time, to initiate a reset operation in which the counter contents and the valve position are brought into accord.

If the stepper motor or valve has no actual position indicating potentiometer or similar apparatus, it is desirable to include a stop against which the valve can be closed and motor stalled in the closing direction to indicate a fixed reference position. If the valve is driven to this fixed position and the counter reset to a reference number such as zero, then the valve and counter means will be in accord. The valve can then be reopened to the desired position while the counter counts the opening pulses in the normal manner to indicate that position.

A typical electronic control for such apparatus might include a digital microprocessor such as the Motorola 6800 or its equivalent, which processes information in eight bit words. Thus, a position count might have any value between 0 and 255 in decimal notation for a total of 256 possible indicated positions. If the valve happens to be open to a position near its open limit, it will require anywhere up to 256 closing pulses plus the additional opening pulses before the reset operation is completed. In some applications, this might require as long as two to three seconds; and, during this time, the engine has no effective idle control by the valve. If the reset were initiated while the vehicle was in a standing idle mode and a heavy load exerted on the engine just after initiation thereof, the engine could easily stall before the reset was completed. In addition, it is undesirable to initiate the reset before the engine is started, since the voltage deliverable by a battery unassisted by an alternator before engine starting might be insufficient to guarantee actuation of the stepper motor by every pulse delivered thereto. There would be no point in initiating such a reset operation routine if one has no confidence that the valve and counter will actually be brought into accord.

SUMMARY OF THE INVENTION

Therefore it is an object of this invention to provide apparatus effective to accord an engine idle air control valve driven by a stepper motor in response to opening and closing pulses and a counter effective to arithmetically count said pulses and retain said count to indicate the position of the valve.

It is a further object of this invention to provide such apparatus which provides reliable accord therebetween and does not subject the engine to the possibility of stall during the period of operation of the apparatus.

An internal combustion engine includes an air induction passage having an idle air control valve positionable by a stepping motor in response to valve opening and valve closing pulses. Counter means are normally effective to arithmetically count said pulses and retain said count as an indication of the idle air control valve position. A stop is provided to limit closure of the idle air control valve. First means are effective when actuated to generate a predetermined number of valve closing pulses sufficient to stall stepping motor against the stop regardless of the actual initial idle air control valve position. Second means are effective to reset the counter to a predetermined reference count such as zero. Third means are effective, upon reset of the counter, to generate a predetermined number of valve opening pulses to return the idle air control valve to a desired operating position, the counter counting such pulses in the normal manner. Fourth means are responsive to vehicle speed and a counter reset signal to actuate the first means upon the first occurrence of a vehicle speed greater than a predetermined speed such as 30 mph following such a counter reset signal. The counter reset signal is generated automatically upon engine start and may also be generated at any time during engine operation by means responsive to a fault or error in the system. A required minimum vehicle speed such as 30 mph guarantees both that the vehicle alternator will provide sufficient voltage for reliable stepper motor operation and that, should a load be imposed upon the engine immediately upon actuation of the first means, the apparatus will nevertheless complete its cycle and restore idle control before vehicle speed decreases sufficiently to stall the engine.

Further objects and advantages of this invention will be apparent from the accompanying drawings and following description of a preferred embodiment.

DESCRIPTION OF THE PREFERRED EMBODIMENT

Figure 1:
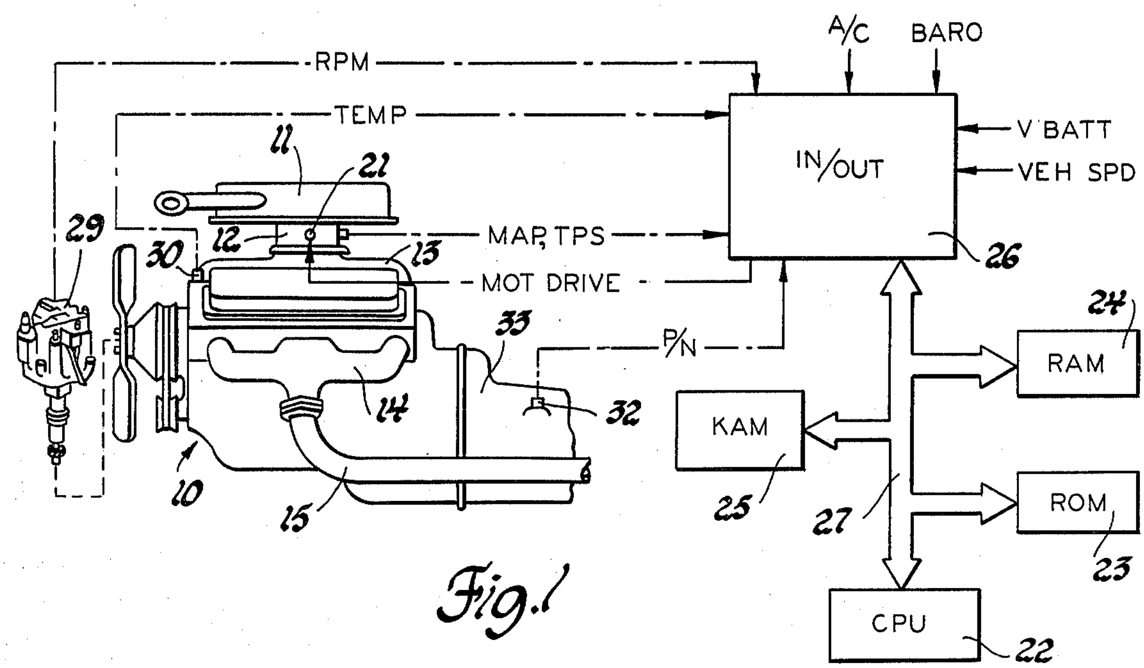
FIG. 1 shows a schematic and block diagram of an engine with an idle air control and position counter reset apparatus according to this invention.
Figure 2:
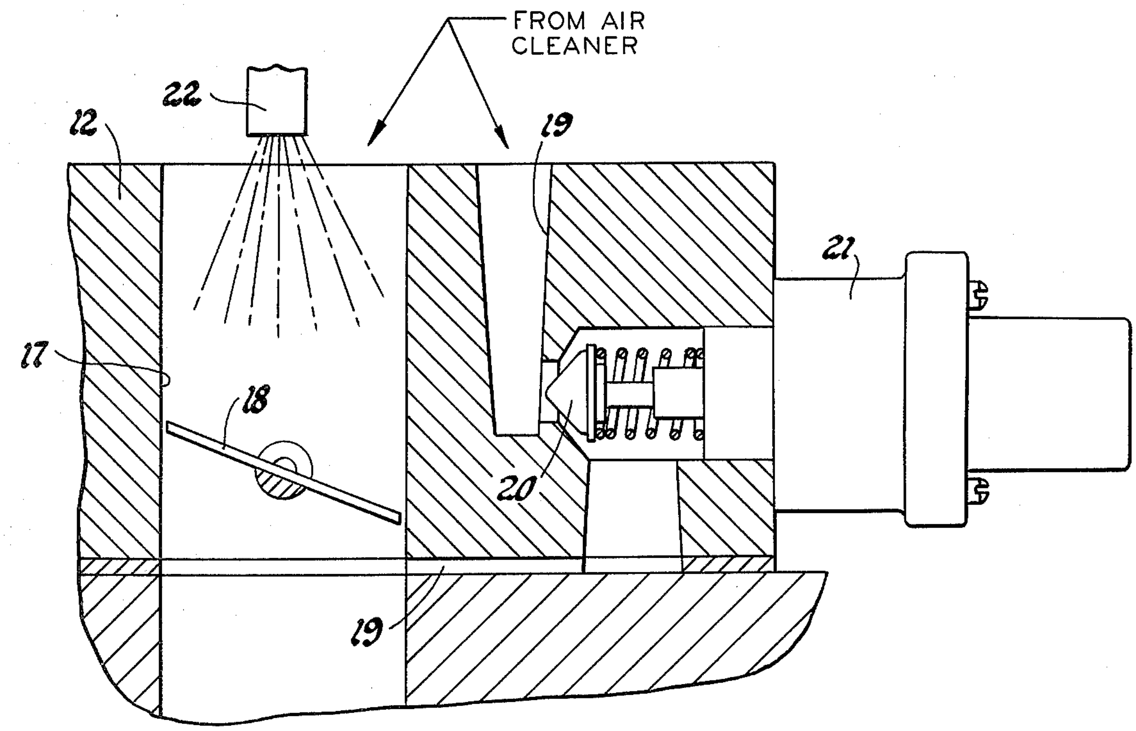
FIG. 2 shows a cutaway of a portion of the air and fuel supply system of the engine of FIG. 1.

Referring to FIG. 1, a multicylinder, internal combustion engine 10 has air intake apparatus including an air cleaner 11, throttle body 12 and intake manifold 13 and exhaust apparatus including manifold 14 and exhaust pipe 15. Referring to FIG. 2, the throttle body 12 is shown defining a main air induction passage 17 having therein an operator-controlled main throttle valve 18 and an idle air bypass passage 19 which bypasses the throttle 18 and has therein an idle air control valve 20 controlled by a stepper motor 21. Fuel injection apparatus is generally denoted by an injector 22 positioned to inject a controlled quantity of liquid fuel into main air induction passage 17. The fuel injection apparatus responds to the manifold pressure so that the fuel added corresponds to the sum of the air flow through the main air induction passageway 17 and the air flow through the bypass passage 19. This fuel is mixed with the air that flows through bypass passage 19 at a point below throttle 18, even in an idle condition, when throttle 18 is "closed", since there is always some leakage of air, and therefore fuel, around the closed throttle 18.

Referring again to FIG. 1, the idle air control includes digital computing apparatus including a central processing unit (CPU) 22, a read only memory (ROM) 23, a random access memory (RAM) 24, a keep alive memory (KAM) 25 and an input/output device (IN/OUT) 26. These devices are standard and are interconnected in the standard manner with buses and other lines indicated generally by a bus 27. Inputs to IN/OUT 26 are an engine speed signal (RPM), provided by an engine driven distributor 29 which generates a pulse signal varying with engine speed, TEMP, provided from an engine coolant temperature sensor 30, MAP and TPS, provided from manifold absolute pressure sensor and throttle position sensor, respectively, not shown, but included within throttle body 12, a park/neutral vs. drive discrete signal (P/N), provided from a park/neutral sensor 32 located in the transmission 33 driven by engine 10, an air conditioning compressor on-off discrete signal (A/C), provided from the compressor, vehicle battery voltage (VBATT), provided from the vehicle battery, not shown, vehicle speed (VEH SPD), which can be obtained from the speedometer or transmission and atmospheric pressure BARO from a pressure. An output signal, MOT DRIVE, is provided from IN/OUT 26 to stepper motor 21. Of course, the computing apparatus shown may include other inputs and outputs and may control other engine functions such as fuel, spark timing, etc.; but, for the sake of simplicity, only those connections and operations are necessary to describe the idle air control are shown in these Figures. Further details of the input and output functions will be described with reference to the flow charts.

Figure 3:
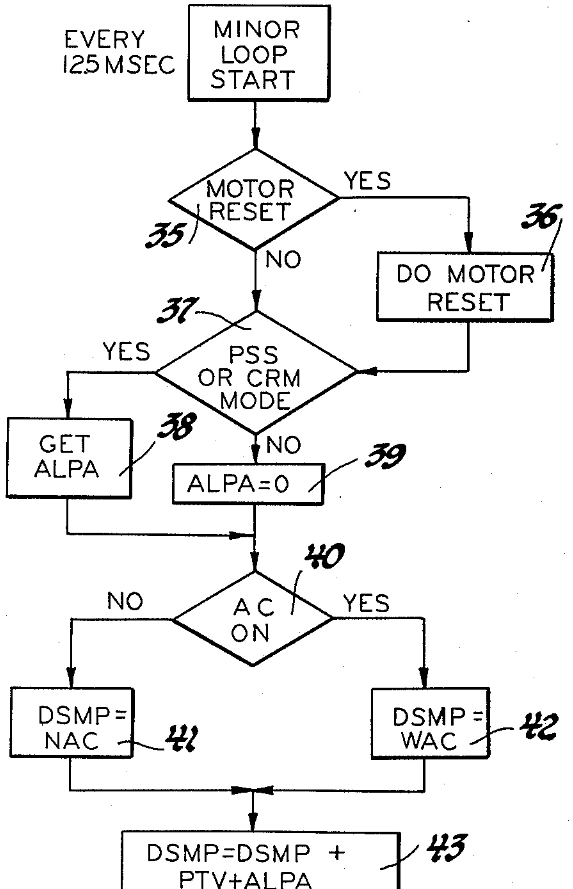
FIGS. 3, 4 and 5 show computer flow charts describing the operation of a simplified version of the idle air control of FIG. 1.
Figure 4:
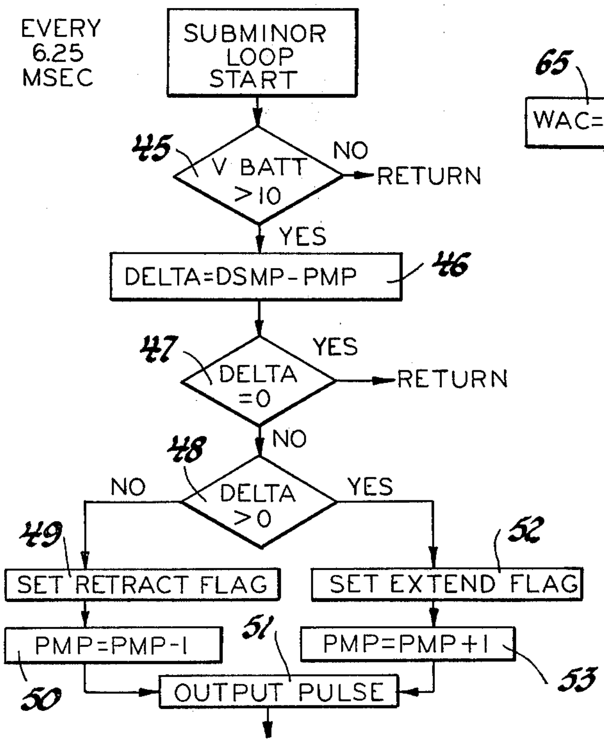
Figure 5:
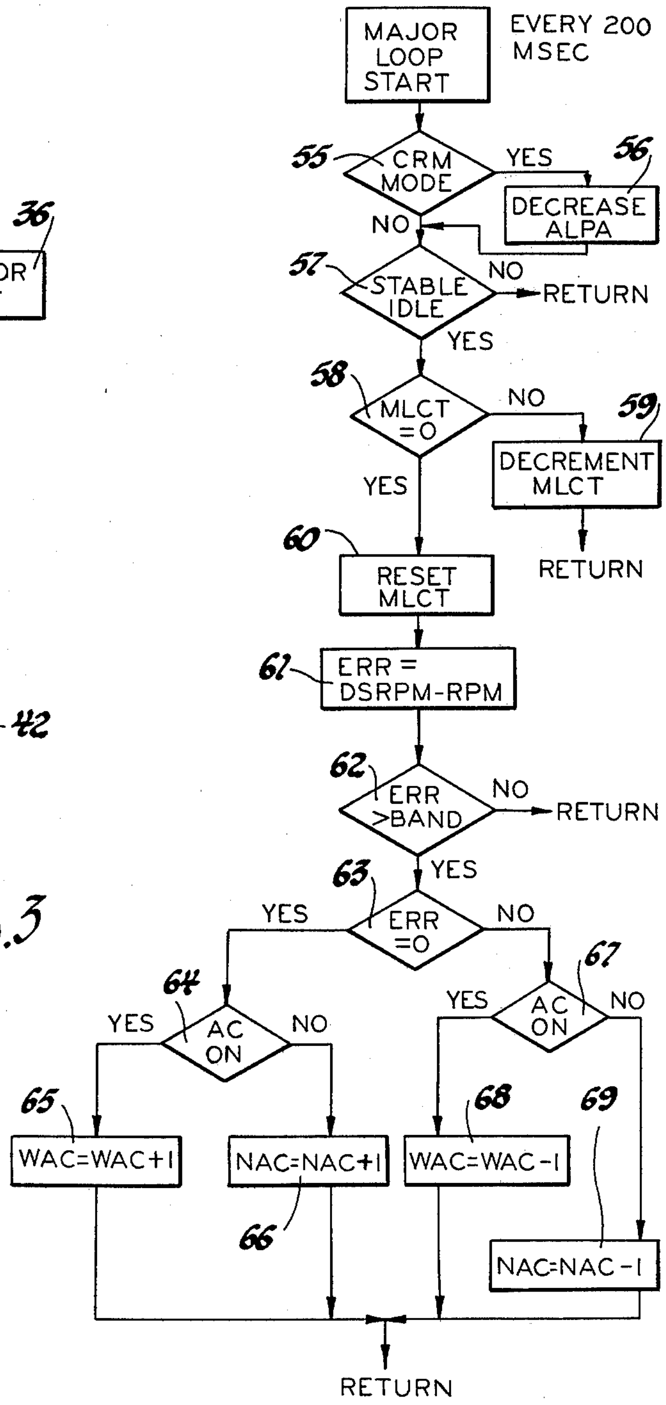

A simplified set of flow charts for the operation of the idle air control of FIGS. 1 and 2 is shown in FIGS. 3–5. FIG. 3 shows a flow chart of a minor loop which runs every 12.5 milliseconds and basically computes a desired stepper motor position. FIG. 4 shows a flow chart for the subminor loop which runs every 6.25 milliseconds and basically computes stepper motor position error and outputs a corrective pulse, if necessary. FIG. 5 shows a flow chart for the major loop which runs every 200 milliseconds and performs certain long term functions such as the fade out of the cracker mode, the detection of the conditions necessary for speed correction and the speed correction itself.

Referring to FIG. 3, the minor loop starts with a decision point 35 at which it is determined whether a motor reset is required or in progress. The motor reset is necessary due to the fact that this embodiment includes no position sensor for the idle air control valve but keeps track of the pulses to the stepper motor arithmetically in up/down counting fashion in a storage location or register in RAM 24. Since it is possible that the actual stepper motor and therefore valve position may become unsynchronized with the count, a motor reset procedure may be initiated in which the stepper motor is driven all the way to the valve closed limit and stalled, the count set to zero and the stepper motor subsequently stepped out to the desired position. This procedure is initiated at the first occurrence of vehicle speed greater than 30 mph after engine start or after the detection of an error in the motor position count. If a motor reset is required or in progress, the flow chart proceeds to step 36 in which the necessary operation is accomplished. This consists mainly in setting the present motor position count to 255 (all ones in an eight bit binary register) and the desired stepper motor position to zero on the first pass and discarding the remainder of the minor loop on each pass until the present motor position counter has decremented to zero in conjunction with the subminor loop to be described at a later point in this specification, then setting the true desired motor position and allowing the system to open the valve thereto.

If a motor reset is not desired or in progress, the minor loop flow chart proceeds to decision point 37, in which it is determined whether the power steering stall or cracker mode flags are set. The power steering stall mode is entered if RPM falls too low and adds a corrective factor ALPA to the desired stepper motor position to open the throttle. The cracker mode causes this factor ALPA to be reduced gradually to zero at the end of a PSS mode. If either of these modes is indicated, the program gets the corrective factor ALPA from a memory location in RAM 24 at step 38. If not, the program sets ALPA equal to zero in step 39.

The program next determines whether the air conditioning compressor is on in decision point 40. If not, the program sets the desired stepper motor position equal to a value NAC at step 41; if so, the program sets the desired stepper motor position equal to a value WAC, which is larger than NAC, in step 42. Finally, in step 43, the program calculates and stores in a register the final desired stepper motor position from the sum of the value already determined (NAC or WAC) plus a temperature correction factor PTV obtained from a lookup table in ROM 23 referenced by TEMP plus the value ALPA already obtained. This desired stepper motor position is stored in a location in RAM 24 for use during the subminor loop and the program exits the minor loop.

The subminor loop starts with a decision point 45 in which it is determined whether the vehicle battery voltage VBATT is greater than 10 volts. If not, the program exits the subminor loop, since the stepper motor 21 may not operate reliably below that voltage. If so, the program proceeds to step 46, in which the positional error of the idle air control valve DELTA is calculated by subtracting the present motor position count PMP from the desired motor position number DSMP. In decision point 47, if DELTA equals zero, the program exits the subminor loop. If not, however, the program proceeds to decision point 48 in which it is determined whether DELTA is positive. If the answer is no, the retract flag is set in step 49, the present motor position count PMP is decremented by one in step 50 and an output pulse is generated in step 51 for delivery to the stepper motor 21. The program then exits the subminor loop. If, at decision point 48, DELTA is found to be positive, the extend flag is set in step 52, the present motor position count PMP is incremented by one in step 52, an output pulse is initiated in step 51 and the subminor loop exited. The extend or retract flags are used to set output apparatus to direct the output pulse to the correct coils of stepper motor 21 for stepping in the desired direction.

The major loop in FIG. 5 begins with a decision point 55, which determines whether the cracker mode flag is set. If it is, the program proceeds to step 56 in which ALPA is decreased by a constant number. This is the part of the program which gradually reduces ALPA in the cracker mode.

From step 56, or if the answer is no at decision point 55, the program proceeds to decision point 57 in which it is determined whether a particular, defined, stable idle condition exists. The rest of the major loop is concerned with a speed correction trim to the desired motor position DSMP of the idle air control valve position control. Such a trim is only desirable when a stable engine idle condition exists so that engine operating conditions are well defined and relatively unchanging. Such an idle condition would preferably be curb idle in which the vehicle is not moving, the throttle is closed, the engine is running and there is no stepper motor position error DELTA. Decision point 57 could comprise tests for these various conditions. If the answer is no, the program exits the major loop. If the answer is yes, the program proceeds to decision point 58 in which it is determined whether a major loop count MLCT equals zero. If not, MLCT is decremented in step 59 and the program exits the major loop. If so, MLCT is reset to some initial value in step 60 and the speed error ERR is calculated in step 61 as the desired engine speed DSRPM minus the actual measured engine speed RPM. The program then proceeds to decision point 62 in which it is determined whether the speed error ERR is within a deadband. If so, the program exits the major loop. If not, the program proceeds to decision point 63 in which ERR is determined to be positive or negative. If positive, the program proceeds to decision point 64 in which it is determined whether the air conditioning compressor is on or off. If on, the value WAC is incremented in step 65; if off, the value NAC is incremented in step 66. If ERR is found to be negative in decision point 63, the program proceeds to decision point 67, in which the air conditioning compressor is determined to be on or off. If it is on, the value WAC is decremented by one in step 68; and, if it is off, the value NAC is decremented by one in step 69. The program then exits the major loop.

FIGS. 6–10 provide more complete and detailed flow charts for the idle air control of FIGS. 1 and 2. Although more complex and difficult to read than the simplified flow charts described above, these flow charts represent the full preferred embodiment.

Figure 6:
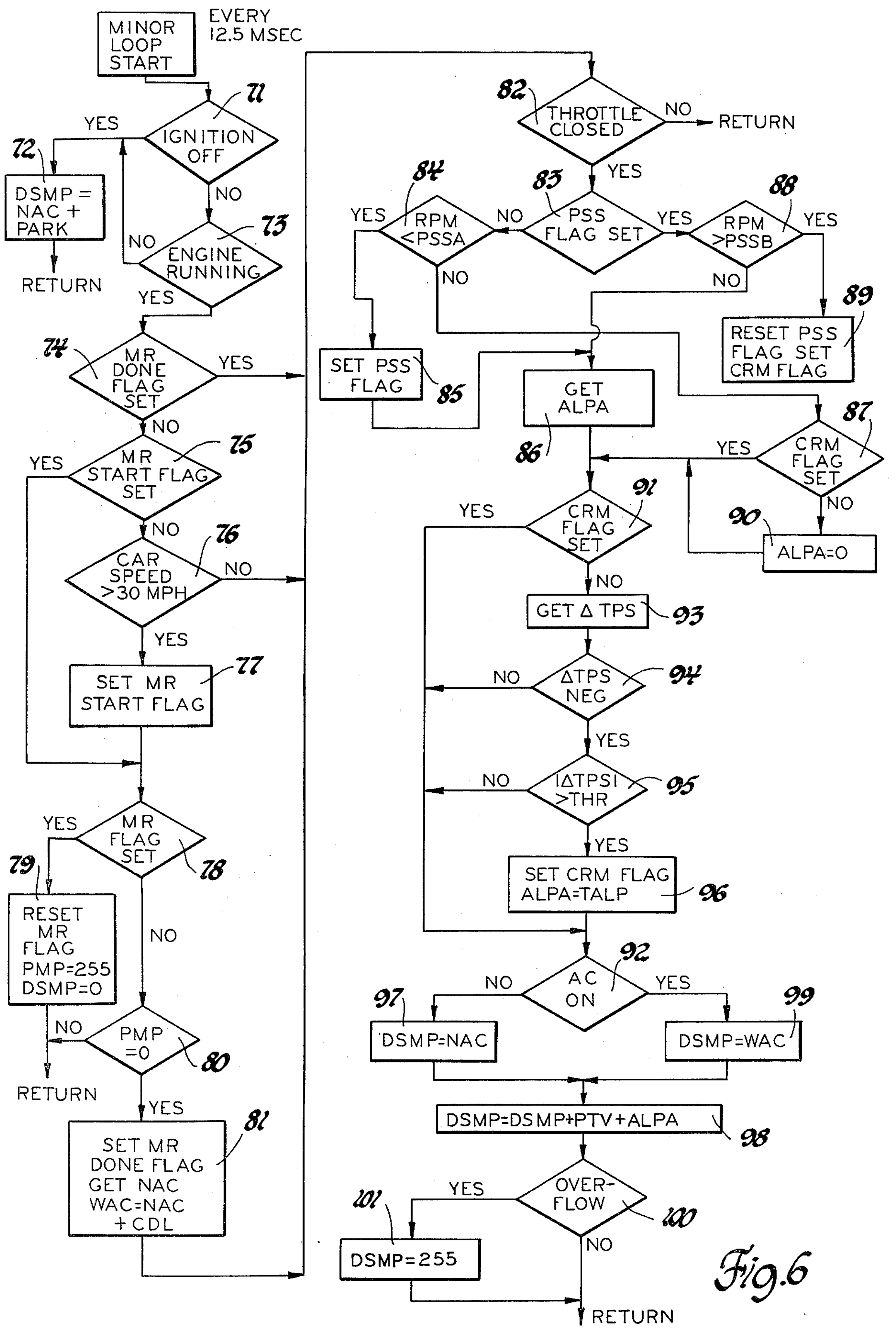
FIGS. 6–10 show computer flow charts for the operation of a more complete embodiment of the idle air control of FIG. 1.

FIG. 6 shows a flow chart of the minor loop which runs every 12.5 milliseconds. It begins at decision point 71, in which it is determined if the ignition is off. This state can occur immediately after engine shutoff, when the computer is run for a short time to set up the engine for the next start. If so, the program proceeds to step 72, in which the desired stepper motor position is set equal to value NAC plus an additional factor PARK, which ensures a more open idle air control valve for cold engine starting. The program then exits the minor loop. If the ignition is on, however, the program proceeds to decision point 73, in which it is determined if the engine is running. If not, the program proceeds to step 72; if so, the program proceeds to decision point 74.

With decision point 74, the minor loop begins that part of its program concerned with motor reset. This portion of the program includes three separate flags: the motor reset flag, the motor reset start flag and the motor reset done flag. In decision point 74, the apparatus checks to see if the motor reset done flag is set. The reset condition of this flag is the counter reset signal. As will be seen in a later description of the initialization routine, this flag will be reset when the vehicle ignition is first activated. It can also be reset at other times if a motor reset is found to be necessary or desirable and is set when the valve closing operation of a motor reset is completed. If it is reset, then a motor reset is desired and the program continues to decision point 75, in which it is determined whether the motor reset start flag is set. If not, then the motor reset routine has not yet begun and the program continues to decision point 76 in which it is determined whether the vehicle speed is greater than 30 mph. If so, the program proceeds to step 77, in which the motor reset start flag is set, and then to decision point 78, in which it is determined whether the motor reset flag is set. The program also reaches decision point 78 directly from decision point 75 if the motor reset start flag has been set previously. This portion of the routine prevents actual initiation of motor reset until a vehicle speed of 30 mph is achieved. This speed is deemed sufficient, for the engine of this embodiment, to prevent stall during the reset routine; it may be different for other engines.

If the motor reset flag is set, the program proceeds to step 79, in which the motor reset flag is reset, the present motor position count PMP is set equal to 255 and the desired stepper motor position DSMP is set equal to 0. This will occur only on the first pass of each motor reset in which decision point 78 is reached; and from step 79 the program exits the minor loop. If the motor reset flag is not set, the program proceeds to decision point 80, in which it is determined whether the present motor position count equals 0. If not, the program exits the minor loop; but if so, the program proceeds to step 81, in which the motor reset done flag is set, the value NAC is obtained from memory and the value WAC is derived from the sum of NAC plus CDL, a stored constant.

From this point, the program proceeds to decision point 82, as it does from decision point 74 if the motor reset done flag is set and from decision point 76 if car speed is not greater than 30 mph. It can be seen that this portion of the program is essentially skipped except when a motor reset is initiated, at which time the present motor position is set equal to 255 and the desired stepper motor position is set equal to 0. The subminor loop is then effective, in 256 consecutive loops, to drive the idle air control valve completely closed and set the present motor position count to 0. When this occurs, the routine sets the desired value of NAC or WAC; the remainder of the minor loop calculates the desired stepper motor position; and the subminor loop once again, in repeated loops, drives the idle air control valve open again to the desired position.

If decision point 82, it is determined whether or not the throttle is closed. If not, the program exits the minor loop; if so, the program proceeds to decision point 83, in which it is determined whether or not the power steering stall flag is set. If it is not, the program proceeds to decision point 84 in which RPM is compared with a value PSSA. If it is, then engine speed is too low, probably as a result of activation of the power steering pump. The program, therefore, proceeds to step 85, in which the power steering stall flag is set and then to step 86, in which the value ALPA is obtained from memory. If RPM is not less than PSSA, however, the program proceeds to decision point 87, which will be described at a later point. This method of detecting activation of the power steering pump could be replaced, if desired, by a pressure sensing switch discrete input similar to the air conditioning compressor.

If the power steering stall flag was found to be set at decision point 83, the program proceeds to decision point 88, in which it is determined whether RPM is greater than or equal to PSSB, a number somewhat larger than PSSA to provide hysteresis in the setting of the power steering stall flag. If the answer is no, the program proceeds to step 86; but if the answer is yes, the program proceeds to step 89, in which the power steering stall flag is reset and the cracker mode flag is set, and then to decision point 87.

In decision point 87, it is determined whether the cracker mode flag is set. If not, ALPA is set equal to 0 at step 90; and the program proceeds to decision point 91. If so, the program proceeds directly to decision point 91. At decision point 91, it is once again determined whether the cracker mode flag is set. If so, the program proceeds to decision point 92. If not, the program proceeds to step 93, in which DELTA TPS is obtained from memory, having been computed at a different point in the program. The program then proceeds to decision point 94, in which it is determined whether or not DELTA TPS is negative. If not, the program proceeds to decision point 92; if so, the program proceeds to decision point 95, in which it is determined whether the absolute value of DELTA TPS is greater than a threshold. If not, the program proceeds to decision point 92; if so, the program proceeds through step 96, in which the cracker mode is set and ALPA is set equal to a value TALP from memory, to decision point 92.

The power steering stall mode is used to open the throttle immediately if RPM drops below a predetermined safe minimum value. Its use is mainly to detect power steering pump operation if no pressure sensor is used in the steering system, but it will also act to save the engine from stall caused by other loads. The throttle cracker mode is used, in conjunction with a portion of the major loop, to return the idle air control valve slowly at the end of a power steering stall mode and to open it quickly by a predetermined amount and close it slowly any time the rate of throttle closure becomes greater than a predetermined closure rate.

At decision point 92, it is determined whether or not the air conditioning compressor is on. If not, the program proceeds through step 97, in which desired stepper motor position DSMP is set equal to NAC, to step 98. If so, the program proceeds through step 99, in which desired stepper motor position DSMP is set equal to WAC, to step 98, in which desired stepper motor position DSMP is modified by the addition of the temperature factor PTV and the additional factor ALPA and stored in a register. The program then proceeds to decision point 100, in which this register is checked for overflow. If there is no overflow, the program exits the minor loop with the calculated value of desired stepper motor position intact. If there is overflow, however, desired stepper motor position is set equal to the number 255 in step 101 before the program exits the minor loop.

Figure 7:
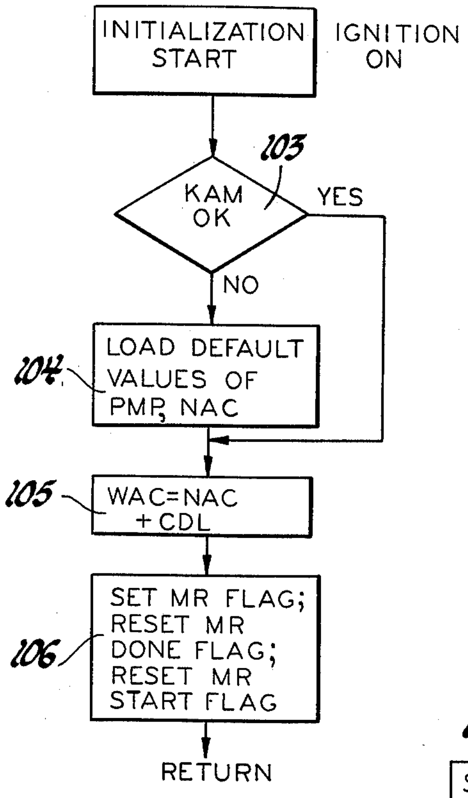

Before discussing the initialization routine of FIG. 7, it would be helpful to describe the function of the keep alive memory (KAM) 25. This keep alive memory is a non-volatile memory which retains its contents intact in the event of the deactivation of the vehicle ignition. Since this type of memory is significantly more expensive than a volatile random access memory, the size is obviously kept to the minimum necessary. Two bytes of this memory are assigned to the idle air control routine. One of these bytes stores the count of the present motor position; and the other byte stores the value of NAC. Each of these parameters may be changed during operation of the system; and it is desired that the last value of each be retained when the vehicle engine and ignition are deactivated so that they will be available for the next activation of the ignition and engine start.

In the initialization routine of FIG. 7, decision point 103 determines whether the keep alive memory is OK. If not, the apparatus is presumed to have lost its values of present motor position and NAC and default values of these parameters obtained from ROM are loaded into appropriate RAM locations. These values are predetermined to be such as to at least enable the engine to operate, even if they are not optimum. The value of present motor position will be corrected during the next motor reset routine; and the value of NAC will be corrected eventually by the major loop speed trim routine. The default values are loaded in step 104. The program proceeds to step 105 either directly from step 104 or from decision point 103 if the keep alive memory is OK. In step 105 the value WAC is computed from NAC by the addition of a factor CDL obtained from ROM. The program then proceeds to step 106, in which the motor reset flag is set and the motor reset done flag and motor reset start flag are reset. The program then exits the initialization routine.

Figure 8:
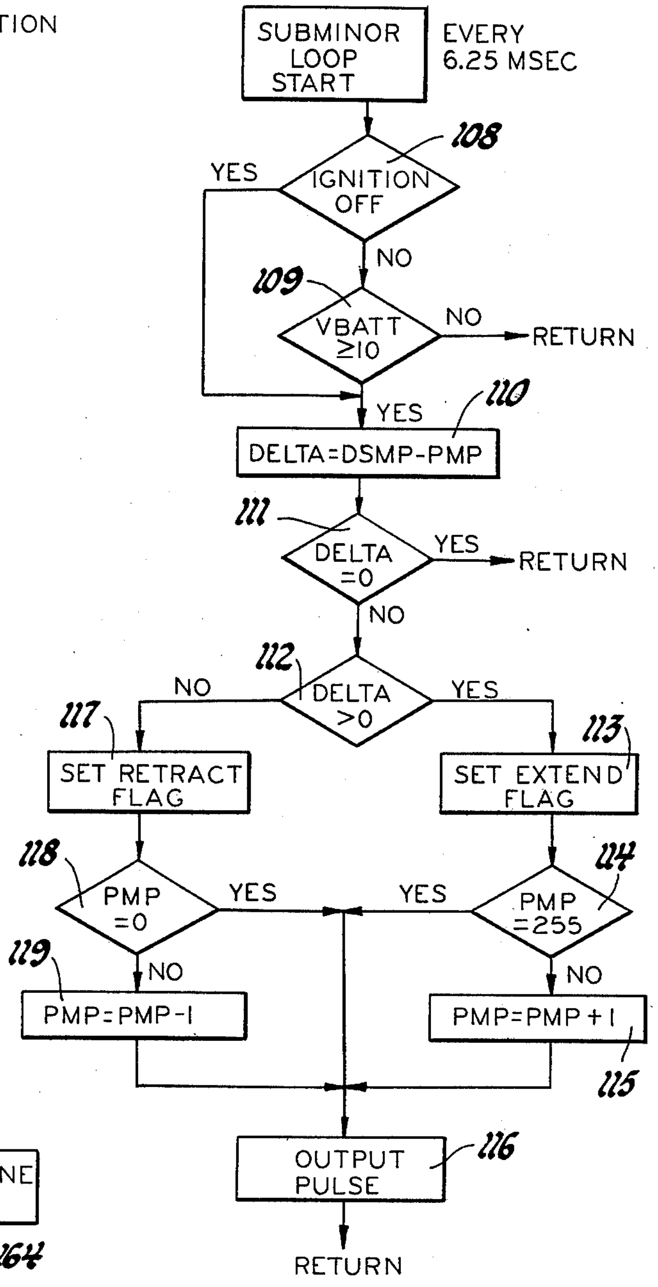

The subminor loop, which runs every 6.25 milliseconds, is described in FIG. 8. The routine begins at decision point 108, in which it is determined if the ignition is off. If not, the program proceeds to decision point 109, in which it is determined whether the battery voltage VBATT is greater than or equal to 10. If the ignition is off, however, the program skips decision point 109 and proceeds directly to step 110. If VBATT is not greater than or equal to 10, the program exits the subminor loop. If it is, however, the program proceeds to step 110, in which the quantity DELTA is determined as the difference of desired stepper motor position DSMP and present motor position count PMP.

The subminor loop then proceeds to decision point 111, from which it exits if DELTA is equal to 0. If not, however, it proceeds to decision point 112 in which it determines whether DELTA is positive. If so, it sets the extend flag in step 113 and checks, in decision point 114, to see whether the present motor position count equals 255. If not, it increments the present motor position count in step 115 and outputs a pulse in step 116. If so, it proceeds from decision point 114 directly to step 116 and may optionally be programmed to reset the motor reset done flag, since the present motor position count at this point should not be as large as 255. If, in decision point 112, DELTA is found to be negative, the retract flag is set in step 117 and the present motor position count is checked for a 0 value at decision point 118. If it is not equal to 0, the present motor position count is decremented in step 119; and the program proceeds to step 116. If it is equal to 0, the program proceeds directly to step 116 and may optionally reset the motor reset done flag. Of course, with the motor reset done flag reset, the minor loop will cause a motor reset routine to be initiated as soon as the vehicle speed is found to be greater than 30 mph.

Figure 10:
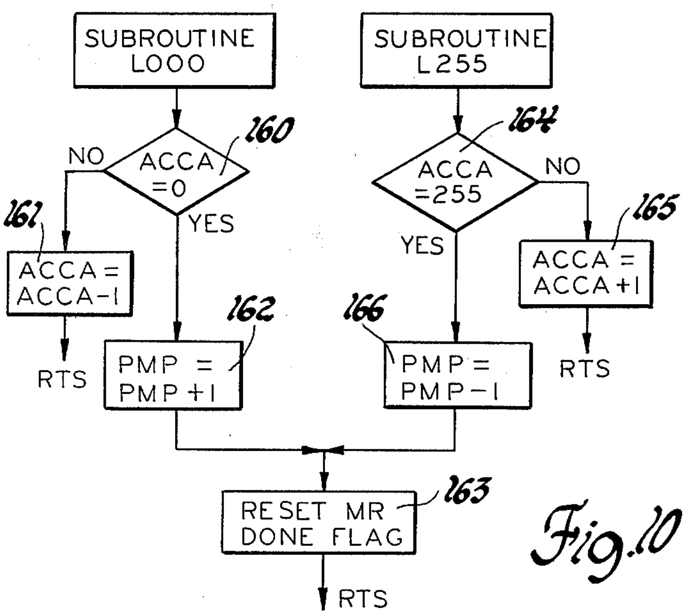
Figure 9:
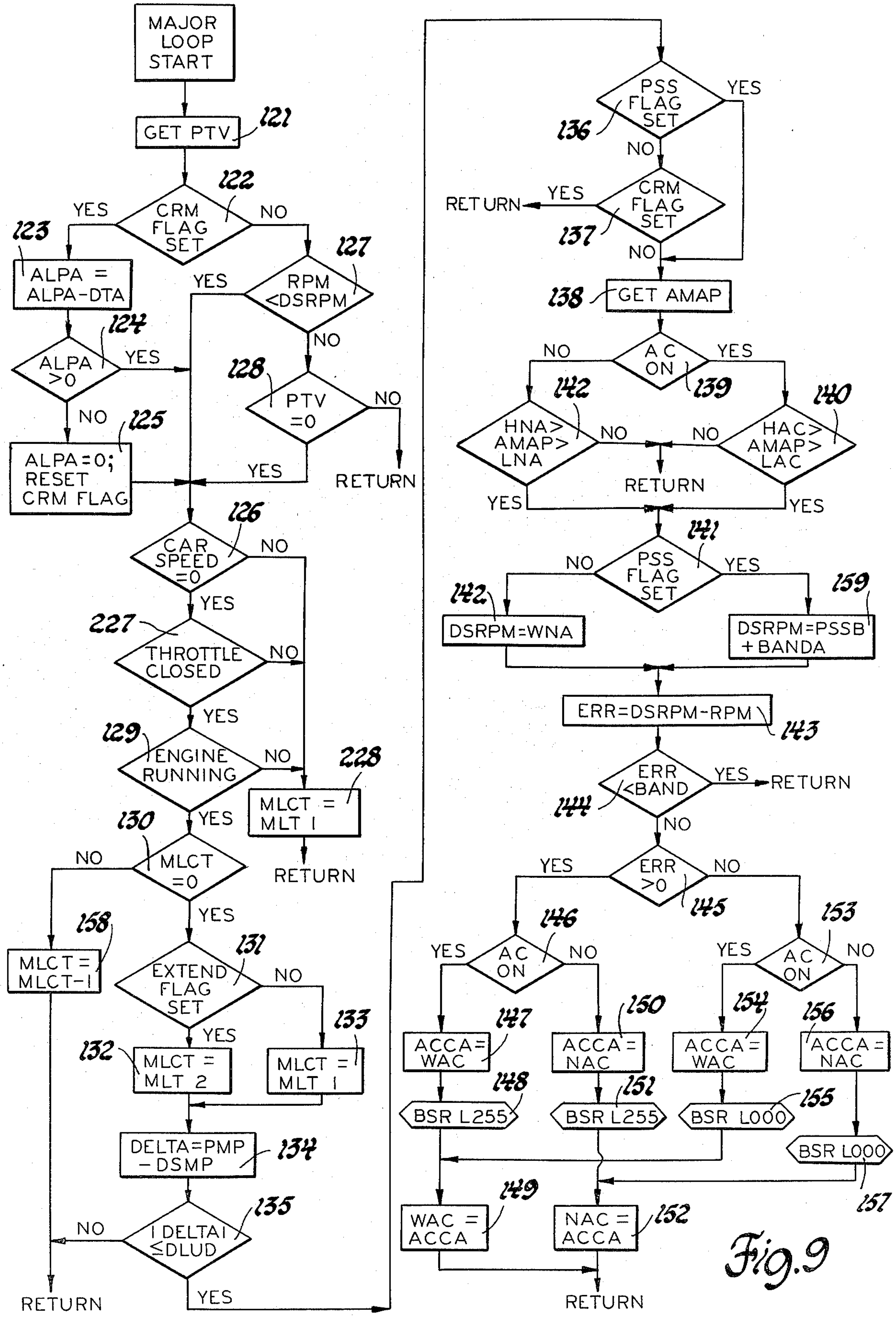

The major loop is described in FIG. 9 and includes a subroutine described in FIG. 10. Referring to FIG. 9, the major loop begins at step 121 by obtaining the temperature factor PTV from RAM. It then proceeds to decision point 122 and, if the cracker mode (CRM) flag is set, then to step 123, in which ALPA is decremented by a number DTA obtained from ROM. At decision point 124, ALPA is tested for greater than 0 and if it is not, it is set equal to 0 and the cracker mode flag is reset in step 125. From step 125, or from decision point 124 if ALPA is greater than 0, the program proceeds directly to decision point 126. The portion of the major loop just described provides a gradual reduction in ALPA over time when the cracker mode flag is set.

Referring back to decision point 122, if the cracker mode flag was not set, the program proceeds to decision point 127 and then, if engine speed RPM is less than desired engine speed DSRPM, directly to decision point 126. If engine speed is not less than the desired engine speed, the program proceeds to decision point 128 in which it is determined whether PTV is equal to 0. The scale of PTV is predetermined such that this question is equivalent to asking whether the engine is warmed up to a predetermined degree. If it is not and RPM is correct or high, it is undesirable to actuate the engine speed trim loop and the program thus exits the major loop. If it is, however, the first condition for stable idle is met, and the program proceeds to decision point 126. Decision point 127 skips the test of decision point 128 if RMP is too low.

From decision point 126, the program proceeds to decision point 227 if vehicle speed equals 0 and to step 228 if vehicle speed does not equal 0. From decision point 227 the program proceeds to decision point 129 if the throttle is closed and to step 228 if it is not closed. From decision point 129, the program proceeds to decision point 130 if the engine is running and to step 228 if it is not. In step 228, the major loop count MLCT is set equal to a number MLT1 obtained from ROM and the program exits the major loop. Thus, the major loop count is reset to a predetermined number and the major loop exited if any of the conditions for stable idle are not met. MLCT determines the number of major loops between each trim correction and, therefore, the rate of correction or gain of the system with respect to speed, since each correction changes WAC or NAC by only one count.

In decision point 130, MLCT is tested for 0 and if it is not, it is decremented in step 131 and the program exits the major loop. If MLCT equals 0, the program advances to decision point 131. From decision point 131, the program advances to step 132, in which MLCT is set equal to a constant MLT2, if the extend flag is set and advances to step 133, in which MLCT is set equal to MLT1, if the extend flat is not set. The two values MLT1 and MLT2 permit different effective gains in the trim correction loop, depending on whether air flow is increasing or decreasing.

From either of the latter two steps, the program advances through step 134, in which the quantity DELTA equal to present motor position PMP minus desired stepper motor position DSMP is computed, to decision point 135, in which DELTA is compared with a constant threshold DLUD. If DELTA is not less than or equal to DLUD, the program exits the major loop, since the stepper motor is not in the correct position and no speed trim is desired until this is corrected. If it is, however, the program advances to decision point 136. From this point, the program advances to decision point 137 if the power steering stall flag is not set and bypasses decision point 137 to go to step 138 if the power steering stall flag is set. From decision point 137, the program exits the major loop if the cracker mode flag is set, since RPM will obviously be changing as ALPA is reduced, and proceeds to step 138 if the cracker mode flag is not set.

In step 138, the program retrieves an altitude compensated manifold absolute pressure value AMAP from memory, the value of AMAP having been calculated in another portion of the program by multiplying a sensed value of manifold absolute pressure by an altitude compensation factor derived from a lookup table addressed by the value of atmospheric pressure BARO. The program then proceeds to decision point 139 and, if the air conditioning compressor is on, to decision point 140, in which the value of AMAP is compared with a pair of numbers HAC and LAC obtained from ROM. If AMAP is between said numbers, the program advances to decision point 141; and, if not, the program exits the major loop. If the air conditioning compressor is not on, the program proceeds from decision point 139 to decision point 142, in which AMAP is compared with a pair of numbers HNA and LNA obtained from ROM. IF AMAP is between said number, the program proceeds to decision point 141; if not, the program exits the major loop. The AMAP range tests are used primarily in lieu of a P/N discrete signal for those vehicles not having a P/N switch, particularly those with manual transmissions. It is not desired to use speed trim with an engaged manual transmission.

The program checks the power steering stall flag in decision point 141 and, if it is not set, sets desired engine speed DSRPM equal to WNA in step 142 and proceeds to step 143. If the power steering stall flag is set, the program proceeds from decision point 141 through step 144, in which the desired engine speed DSRPM is set equal to PSSB plus BANDA, and then proceeds to step 143. It will be noticed, with reference to the minor loop, that PSSB is the upper reference in the PSS mode tests. Thus PSSB+BANDA is a speed sufficient, when it is attained, to kick the engine out of the PSS mode. This prevents the engine from just sitting in the PSS mode for a long time when it is not necessary. In step 143, an error quantity ERR is derived from the desired engine speed minus the actual engine speed and the quantity ERR is then compared with a deadband quantity BAND at decision point 144. If it is smaller than BAND, the program exits the major loop.

If the absolute value of ERR is greater than or equal to BAND, a speed trim correction will be made; the exact procedure to be followed depends on the sign of the error, since this determines the direction of correction, and whether or not the air conditioning compressor is on, since this determines the value that is to be corrected. The program proceeds to decision point 145, in which the sign of ERR is checked. If it is positive, the program proceeds to decision point 146, in which the state of the air conditioning compressor is checked. If the air conditioning compressor is on, the program proceeds through step 147, in which the value of WAC is brought into a main register ACCA, and the program branches to a subroutine L255 in step 148. Those familiar with the Motorola 6800 microprocessor will recognize register ACCA as accumulator A. The program then proceeds through step 149, in which the number in register ACCA is returned to location WAC in RAM, and then exits the major loop. If the air conditioning compressor is not on, the program proceeds from decision point 146 to step 150, in which the value NAC is stored in register ACCA. Subroutine L255 is called in step 151 and then, in step 152, the number in register ACCA is restored in location NAC of RAM. If the quantity ERR is negative, the program proceeds from decision point 145 to decision point 153, in which the state of the air conditioning compressor is checked. If it is on, the program proceeds through step 154, in which WAC is stored in register ACCA, through step 155, in which subroutine L000 is called, to step 149. If the air conditioning compressor is not on, the program proceeds from decision point 153 through step 156, in which the value of NAC is stored in register ACCA, through step 157, in which subroutine L000 is called, to step 152.

Subroutines L000 and L255 are described in FIG. 10. Subroutine L000 begins by testing the contents of register ACCA for 0 at decision point 160. If the number is not 0, the contents of the register ACCA are decremented in step 161 and the program returns to the main routine. If register ACCA does contain 0, however, the present motor position count is incremented in step 162 and the motor reset done flag is reset in step 163, after which the program returns to the main routine. This subroutine checks to see if the appropriate quantity WAC or NAC has reached the lower limit of 0 and, if it has, achieves the desired speed correction by the indirect method of incrementing the present motor position count, since it is impossible to further decrement the value of the reference. The subroutine further calls for a motor reset, since, if the value of the reference has reached its lower limit, the present motor position count must be in error.

Subroutine L255 is similar but designed to detect the upper limit. It begins with decision point 164, in which the contents of register ACCA are tested for the number 255, which is all "ones" in binary. If it is not, then the contents of register ACCA are incremented in step 165 and the program returns to the main routine. However, if the upper limit has been reached, the present motor position count is decremented in step 166, the motor reset done flag is reset in step 163 and only then does the program return to the major loop.

The embodiments of the invention in which an exclusive property or privilege is claimed are defined as follows:

1. In an engine driven vehicle, the engine being of the internal combustion type including an air induction passage having an idle air control valve positionable by a stepping motor in response to valve opening and valve closing pulses with counter means normally effective to arithmetically count said pulses and retain said count and thereby indicate idle air control valve position but being possibly subject to error in said indication and a stop effective to limit closure of the idle air control valve, counter reset apparatus comprising:

first means effective when actuated to generate a predetermined number of valve closing pulses sufficient to stall the stepping motor against the stop regardless of the actual initial idle air control valve position;

second means effective, at least upon generation of the last valve closing pulse by the first means, to reset the counter to a predetermined reference count;

third means effective, upon reset of the counter, to generate a predetermined number of valve opening pulses to return the idle air control valve to a desired operating position, the counter counting such pulses in the normal manner; and fourth means effective to detect the first occurrence of vehicle speed greater than a predetermined speed following a counter reset signal and actuate the first means in response thereto, the predetermined speed being sufficient to prevent engine stall during the counter reset by this apparatus due to a decrease in vehicle and therefore engine speed initiated after actuation of the first means.

2. In an engine driven vehicle, the engine being of the internal combustion type including an air induction passage having an idle air control valve positionable by a stepping motor in response to valve opening and valve closing pulses with counter means normally effective to arithmetically count said pulses and retain said count and thereby indicate idle air control valve position but being possibly subject to error in said indication and a stop effective to limit closure of the idle air control valve, counter reset apparatus comprising:

first means effective when actuated to generate a number of valve closing pulses sufficient to stall the stepping motor against the stop regardless of the actual initial idle air control valve position;

second means effective, at least upon the last valve upon actuation of the closing pulse generated by the first means, to reset the counter to a predetermined reference count;

third means effective, upon reset of the counter, to generate a predetermined number of valve opening pulses to return the idle air control valve to a desired operating position, the counter counting such pulses in the normal manner; and fourth means effective to detect the first occurrence of vehicle speed greater than 30 mph following a counter reset signal and actuate the first means in response thereto, the counter reset signal being generated at least upon each initiation of engine operation, the predetermined speed being sufficient to prevent engine stall during the counter reset by this apparatus due to a decrease in vehicle and therefore engine speed initiated after actuation of the first means.

* * * * *

UNITED STATES PATENT AND TRADEMARK OFFICE

CERTIFICATE OF CORRECTION

PATENT NO. : 4,359,983

DATED : November 23, 1982

INVENTOR(S) : Clifford R. Carlson and Leo H. Voelkle

It is certified that error appears in the above—identified patent and that said Letters Patent is hereby corrected as shown below:

Column 3, line 2, "passageway" should read -- passage --.

Column 4, line 62, "52" should read -- 53 --.

Column 6, line 54, "If" should read -- In --.

Column 10, line 22, "IF" should read -- If --.

Signed and Sealed this

*Thirty-first* Day of *May 1983*

[SEAL]

*Attest:*

DONALD J. QUIGG

*Attesting Officer* *Acting Commissioner of Patents and Trademarks*